United States Patent [19]
Mitsui

[11] Patent Number: 5,029,677
[45] Date of Patent: Jul. 9, 1991

[54] DAMPING SYSTEM FOR VIBRATING BODY

[75] Inventor: Junichi Mitsui, Saitama, Japan

[73] Assignee: Toa Nenryo Kogyo Kabushiki Kaisha, Tokyo, Japan

[21] Appl. No.: 351,158

[22] Filed: May 12, 1989

[30] Foreign Application Priority Data

| May 13, 1988 | [JP] | Japan | 63-114898 |
| May 13, 1988 | [JP] | Japan | 63-114899 |
| May 13, 1988 | [JP] | Japan | 63-114900 |
| May 13, 1988 | [JP] | Japan | 63-114901 |
| May 18, 1988 | [JP] | Japan | 63-119245 |
| May 18, 1988 | [JP] | Japan | 63-119246 |
| May 18, 1988 | [JP] | Japan | 63-119247 |
| Dec. 27, 1988 | [JP] | Japan | 63-327916 |

[51] Int. Cl.$^5$ .......................................... F16F 15/03
[52] U.S. Cl. ............................ 188/267; 188/299; 188/317; 188/322.22; 188/378; 248/550
[58] Field of Search .................. 188/378–380, 188/322.15, 322.22, 281, 282, 317, 299, 267, 268, 280; 280/707, 709, 710; 180/300, 312, 902; 248/550; 267/140.1, 136

[56] References Cited

U.S. PATENT DOCUMENTS

| 4,606,440 | 8/1986 | Buchanan, Jr. et al. | 188/299 X |
| 4,732,408 | 3/1988 | Öhlin | 188/322.15 X |
| 4,733,758 | 3/1988 | Duclos et al. | 188/267 |
| 4,742,998 | 5/1988 | Schubert | 267/140.1 X |
| 4,819,772 | 4/1989 | Rubel | 188/267 X |
| 4,826,205 | 5/1989 | Kouda et al. | 188/299 X |
| 4,858,733 | 8/1989 | Noguchi et al. | 188/267 |
| 4,861,006 | 8/1989 | Takano et al. | 188/267 X |
| 4,869,476 | 9/1989 | Shtarkman | 188/267 X |

FOREIGN PATENT DOCUMENTS

| 0297608 | 1/1989 | European Pat. Off. | 188/267 |
| 3631107 | 3/1988 | Fed. Rep. of Germany | 188/267 |
| 0113644 | 7/1983 | Japan | 267/140.1 |
| 0210432 | 9/1988 | Japan | 188/267 |
| 1282568 | 7/1972 | United Kingdom | 188/267 |

Primary Examiner—Douglas C. Butler
Attorney, Agent, or Firm—Finnegan, Henderson, Farabow, Garrett & Dunner

[57] ABSTRACT

A viscous damper wherein the viscosity of a fluid, such as an oil, is used to generate damping effect when the fluid is passed through a restricted orifice or slit. Electrodes are arranged to face each other across the orifice or slit so that an electric field is created in a direction which is transverse to the direction of the fluid flow in the orifice or slit. The voltage applied to the electrodes is controlled in accordance with a frequency of vibration of a vibrating member to be damped. The viscosity of the fluid is controlled by applying a voltage thereto, so that a desired damping effect is obtained within a wide range of the frequency of the vibrating body.

5 Claims, 14 Drawing Sheets

TO VIBRATING BODY
TO BE DAMPED

TO VIBRATING BODY
TO BE DAMPED

DAMPING SYSTEM FOR VIBRATING BODY

BACKGROUND OF THE INVENTION

1. Field of the Invention

The present invention relates to a damping system able to suppress vibration of any vibrating body including buildings, various machines, or vehicles.

2. Description of the Related Arts

Known in the prior art is a damping system for decreasing the vibration in a vibrating body, and having a damper providing a damping ability based on the viscosity of a fluid such as oil. In this type of damper, an orifice is provided in a piston connected to the vibrating body, and the viscosity of the fluid causes a resistance force to be generated in the piston when the fluid passes through the orifice. This resistance force allows a damping function to be imparted to the vibrating body. Furthermore, for a rotating shaft, a damping system is known where an annular slit is formed between the bearing assembly and support body, which creates an annular film of fluid in the annular slit. When the shaft is vibrated, the film of viscous fluid in the slit is squeezed to obtain a damping effect. (See Japanese Unexamined Patent Publication Nos. 54-96650 and 57-1822).

The damping effect provided by these prior art dampers is based on the viscosity of a fluid in an orifice(s), which determines a damper ratio. In these prior arts, the damper system, however; has only one damping ratio, and this cannot be varied after the damping system is assembled. This means that a desired damping effect can be obtained only when the damper is used for a vibrating system having a designated characteristic. Namely, a desired damping effect can not be obtained when the damper is used for a vibrating system other than that designated. Furthermore, the prior art damping system can not obtain a desired damping effect when used for a vibrating member having vibrating characteristic which is changed in accordance with a lapse of time.

SUMMARY OF THE INVENTION

An object of the present invention is to provide a damping system having a damping characteristic which is easily varied to impart a desired damping characteristic to a vibrating body.

According to the present invention, a damper system is provided, which is able to dampen a vibrating body movable on a stationary member, the system comprising:

a damping means for defining an area of a fluid for creating a resistance to the movement of the vibrating body, caused by the viscosity of fluid passing through said area, said fluid being an electrorheological fluid able to obtain a Winslow effect when an electric field is applied to the fluid;

electrode means arranged in said area for generating such an electric field in the area, and;

damping control means for controlling the strength of the electric field so that a desired damping characteristic of the damper is obtained within a designated range of the frequency of the vibration of the vibrating body.

BRIEF DESCRIPTION OF DRAWINGS

FIG. 13' is partial enlarged view of FIG. 13 illustrating a detail of the spacers;

DESCRIPTION OF THE PREFERRED EMBODIMENTS

Figure 1:
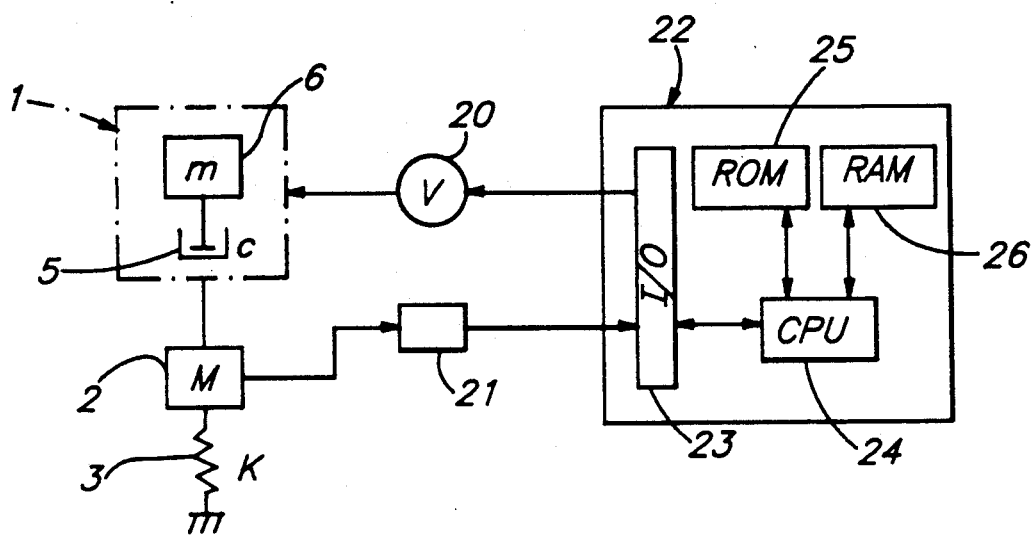
FIG. 1 is a general schematic view of the damping system according to the present invention.

FIG. 1 is a schematic diagram of a damping system according to the present invention. In FIG. 1, 2 denotes a body having a weight M to be dampened, and supported by a supporting element having a spring factor k; and 1 denotes a damping system according to the present invention for damping the body 2, and comprises a damper 5 having a damping factor c, and a supplemental body 6 having weight m.

Figure 2:
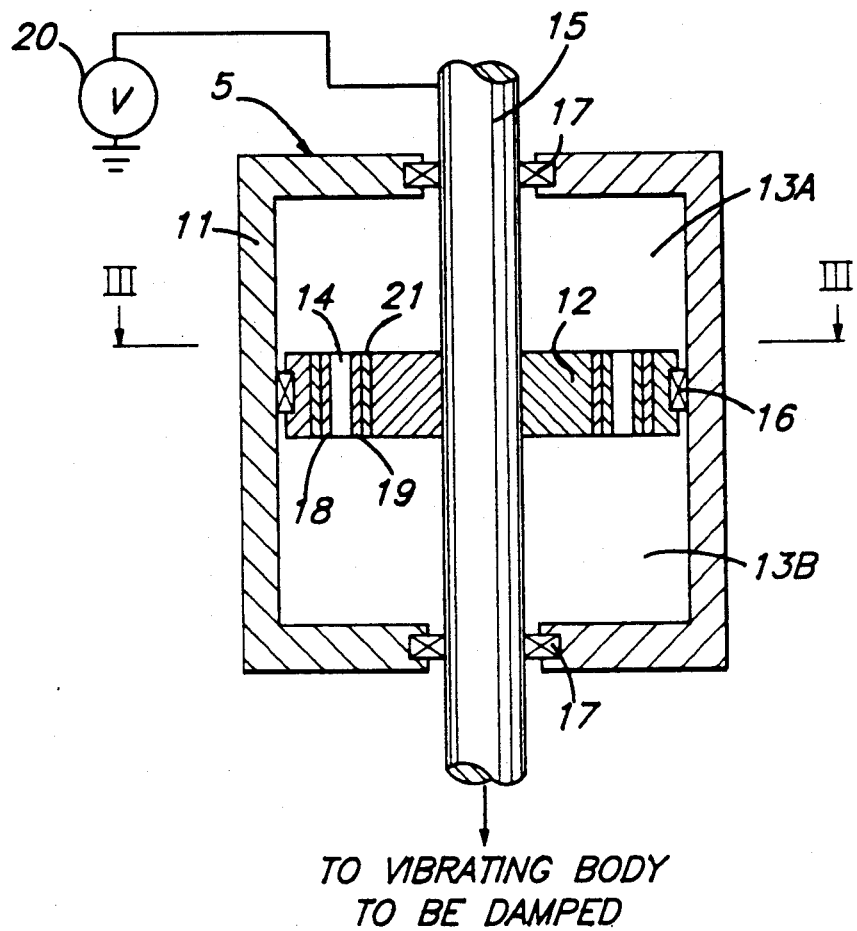
FIG. 2 is a longitudinal cross sectional view of a piston damper in a first embodiment of the present invention.
Figure 3:
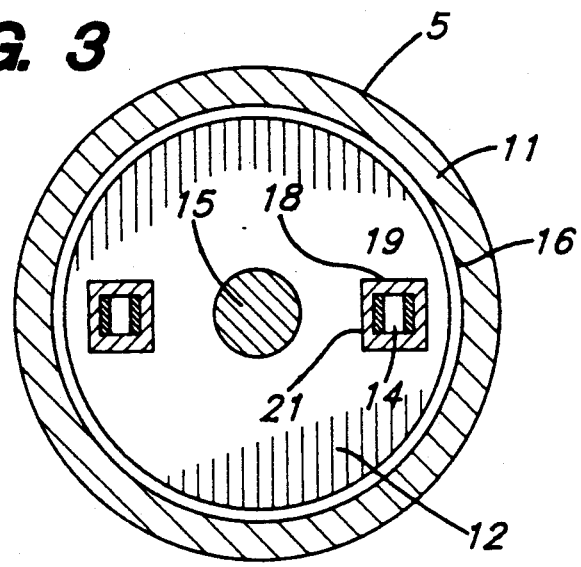
FIG. 3 is a cross sectional view taken along line III—III in FIG. 2.

In the first embodiment, as shown in FIGS. 2 and 3, the damper 5 comprises a damper case 11 defining an axially elongated circular cylindrical portion, and upper and lower end walls, and a piston 12 arranged in the damper case in such a manner that the piston 12 is axially slidable in the damper case 11. The piston 12 divides the interior of the case into fluid chambers 13A and 13B, and defines a passageway 14 having a substantially rectangular shape which connects the upper and lower chambers 13A and 13B. A shaft 15 is fixedly connected to the piston 12 and is extended axially to be projected outside the upper and lower walls of the case 11. An annular piston ring seal 16 is arranged around the outer periphery of the piston 12 to provide a sealing contact with the inner surface of the case 11 when the piston 12 is slidably moved in the case 11. Furthermore, a pair of seal members 17 are mounted in the upper and lower end walls of the casing 11, to obtain a fluid-tight sliding of the shaft 15 with respect to the case 11. In this embodiment, as shown in FIG. 3, two passageways 14 are arranged on the piston 12 in a diametrically opposite relationship. Note, any number of passageways, even only one passageway can be provided and the arrangement thereof suitably determined.

An electrorheological fluid for obtaining the Winslow effect is stored in the chambers 13A and 13B. As shown in FIG. 3, the piston defines rectangular shaped openings to each of which a sleeve 21 made of an electric insulating material and having a shape complimentary to that of the opening, is fitted. Each sleeve 21 defines a pair of opposing inner faces, on which electrodes 18 and 19 are formed so as to face each other, whereby the passageway 14 is formed therebetween. A computer operated electric supply device 20 is provided for supplying an electric voltage across the facing electrodes 18 and 19. As is well known, the wiring for connecting the electric source 20 to the electrodes 18 and 19 may be introduced into the shaft from an end thereof located outside of the damper case 11. Alternately, the electric supply device 20, per se, may be arranged inside of the shaft 15.

When a voltage is applied across the electrodes 18 and 19, between which a passageway 14 is formed, an electric field is created in a direction transverse to the direction of the flow of the electro rheological fluid passed through the passageway from the upper chamber 13A to the lower chamber or vise versa, and the viscosity of the fluid passed through the passageways 14 is changed in accordance with the strength of the electric field applied. Accordingly, the flow resistance as applied by the passageway 14 can be controlled in accordance with the strength of the applied electric field to control the damping factor produced by the damper 5.

This well known effect is called the Winslow effect, and was first disclosed in U.S. Pat. No. 2,417,850 by W. M. Winslow, in 1947, wherein an electrorheological fluid including a fluid (a suspending medium) suspended by pulverulent (dispersing phase) is located between a pair of electrodes. When an electric voltage is applied across the electrodes, a value of the viscosity of the fluid is increased due to the influence of the external electric field. The value of the viscosity can be controlled in accordance with the value of the external electric field, and a quick response in a change of the viscosity is obtained when the voltage level is changed. As the dispersing phase, a fine crystal type cellulose, silica gel, soybean casein and mica ican are known, and any one of thereof can be employed. As the dispersing medium, silicone oil, diphenyl chloride, and sebacic acid dibutyl are known, and any one of thereof can be suitably employed. Furthermore, a combination of the dispersing agent and dispersing medium can be selected in accordance with a desired characteristic.

More generally, the electrorheological fluid is constructed from a non-electric conductive fluid as a dispersing medium. As a dispersing medium, any mineral oil or synthetic oil can be employed, including, more particularly, naphthenic mineral oil, paraffin mineral oil, poly alpha olefins, poly alkylene glycol, diester, polyol ester, phosphoric ester, silicone compounds, fluoride compounds, polyphenyl ether, and synthetic hydro carbons. The viscosity of these fluids is preferably in a range of between 5 to 300 cps under a temperature of 40 degrees of centigrade. A dispersing phase as solid particles are introduced into the dispersing medium, including silica gel, water impregnated resin, diatomaceous earth, alumina, silca-alumina, zeolite, ion-exchange resin, and cellulose. These particles usually have a diameter in a range between 10 $\mu$m to 200 $\mu$m, and their weight percent in the medium is in a range between 0.1 to 5 wt %. Furthermore, water is added to the medium for obtaining the electrorheological characteristic so as to be absorbed in the particles, which permit the particles to be polarized easily in an electric field. The weight percent of the water with respect to the solid particles is normally in a range of between 1 to 20 wt %. A dispersing agent is then added in order to obtain a uniform and stable condition of dispersion of the solid particles in the medium. As the dispersing agent, sufonates, phosphonates, succinic amides, amines, esters, and non-ionic dispersion agents, and more particularly, magnesium sulfonate, calcium sulfonate, calcium phosphonate, poly butenyl succinic amide, sorbitan mono oleate, and sorbitan sesqui oleate can be used. The weight percent of them is normally in a range of between 0.1 to 10 wt %. The dispersion agent can be eliminated when the solid particles have good dispersion ability.

In FIG. 1, 22 denotes an electronic control circuit for operating the electric supply circuit 20 so that a desired voltage is applied across the pairs of electrodes 18 and 19. The control circuit 22 is constructed, for example, as a microcomputer system provided with a CPU 24, a ROM 25, a RAM 26, and an input-output port 23. The input-output port 23 is connected to the electric supply device 20 to output an electric signal thereto for controlling the voltage output therefrom. The input-output port 23 is also connected to a sensor 21 for detecting the number of oscillations $\omega$ of the body 2 to be dampened, so that an electric signal, which indicates the number of oscillations of the body 2, is input into the input-output port 23.

Figure 4:
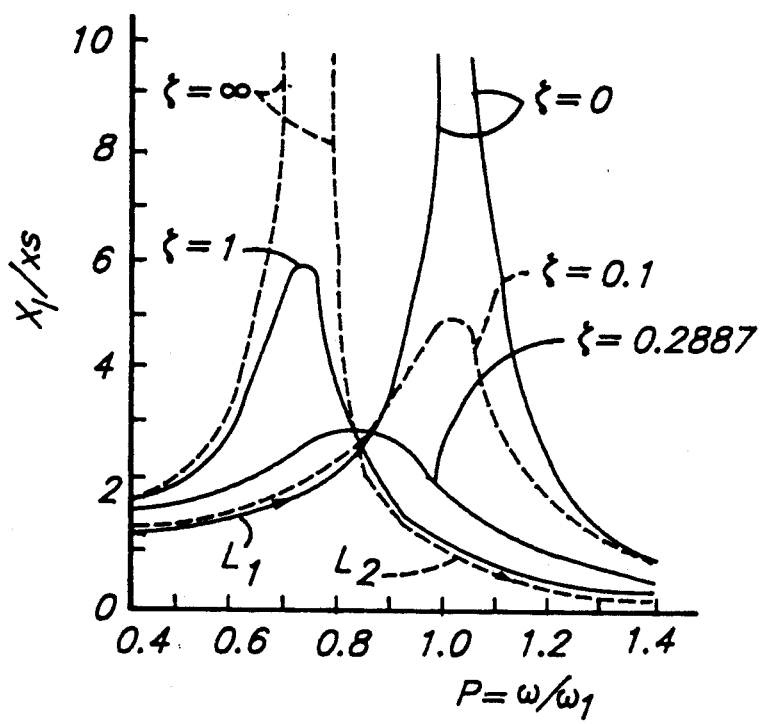
FIG. 4 is a graph showing relationships between a non-dimensional frequency and a non-dimensional amplitude with regard to various damping ratio values.

The damping ratio $\zeta$ of the damper 1 of the oscillating system in FIG. 1 is obtained by $$\zeta = \frac{c}{2m} \times \sqrt{\frac{M}{K}}$$

where c is a damping factor. When an external force is applied to the body 2, it is oscillated under a number of oscillations $\omega$ and an amplitude of the oscillation X1. The relationships between a number of the oscillations $\omega$ and the amplitude X1 are shown in FIG. 4 with respect to four values of the damping ratio as parameters, i.e. 0, 0.1, 0.2887, 1.0 and ∞. In FIG. 4, the abscissa is indicated by a non-dimensional value by dividing w by an intrinsic number of oscillations of the oscillating body, $$\omega 1 = \sqrt{K/M},$$

and the ordinate is indicated by a non-dimensional value by dividing the amplitude X1 by the intrinsic amplitude of the oscillating body, $xs = Mg/K$.

The damping factor ζ is determined by variables such as the weight M of the oscillating body 2, the spring factor K, weight m of the auxiliary member 6, and the damping factor c. These variables are selected to obtain a desired damping characteristic. In the prior art, these factors have a constant value, and therefore, it is impossible to vary the damping factor after the damping device 1 is connected to the oscillating member 2. This means that an optimum damping characteristic can not be obtained if the damping device 1 is used for a vibrating body which has different characteristic from that designated. Furthermore, the designated damping characteristic can not be obtained within a wide range of vibrating numbers, which occur if the damper is used for a vibrating body in which different modes of vibration occur with a lapse of time.

Figure 5:
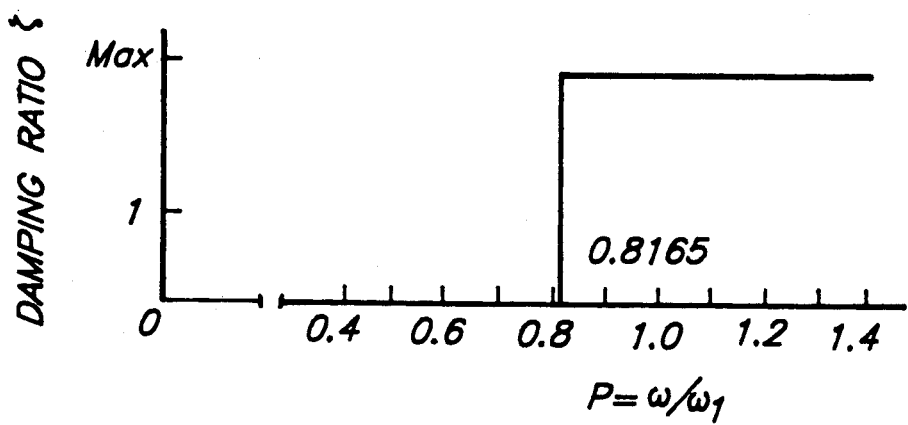
FIG. 5 is an example of setting a damping ratio within the frequency of the vibration.

Contrary to this, according to the present invention, the damper fluid is by an electrorheological fluid providing the Winslow effect, and the magnitude of the electric field at the electro rheological fluid can be controlled so that the viscosity of the fluid can be suitably changed, and as a result, a suitable control of the damping factor, i.e., damping ratio ζ of the damper 5, is realized. In an embodiment of the present invention, the damping ratio ζ is controlled as shown in FIG. 5, wherein the lowest value is obtained in a range of a non-dimensional frequency P of between 0 to 0.8, and the maximum value is obtained in a range of the non-dimensional; frequency between 0.8 to 1.4. As a result of this control of the damping ratio ζ, the amplitude X1 of the vibrating body (M) is controlled to a low amplitude over a wide range of the frequency of the vibration as shown by thick arrowed lines in FIG. 4.

Figure 6:
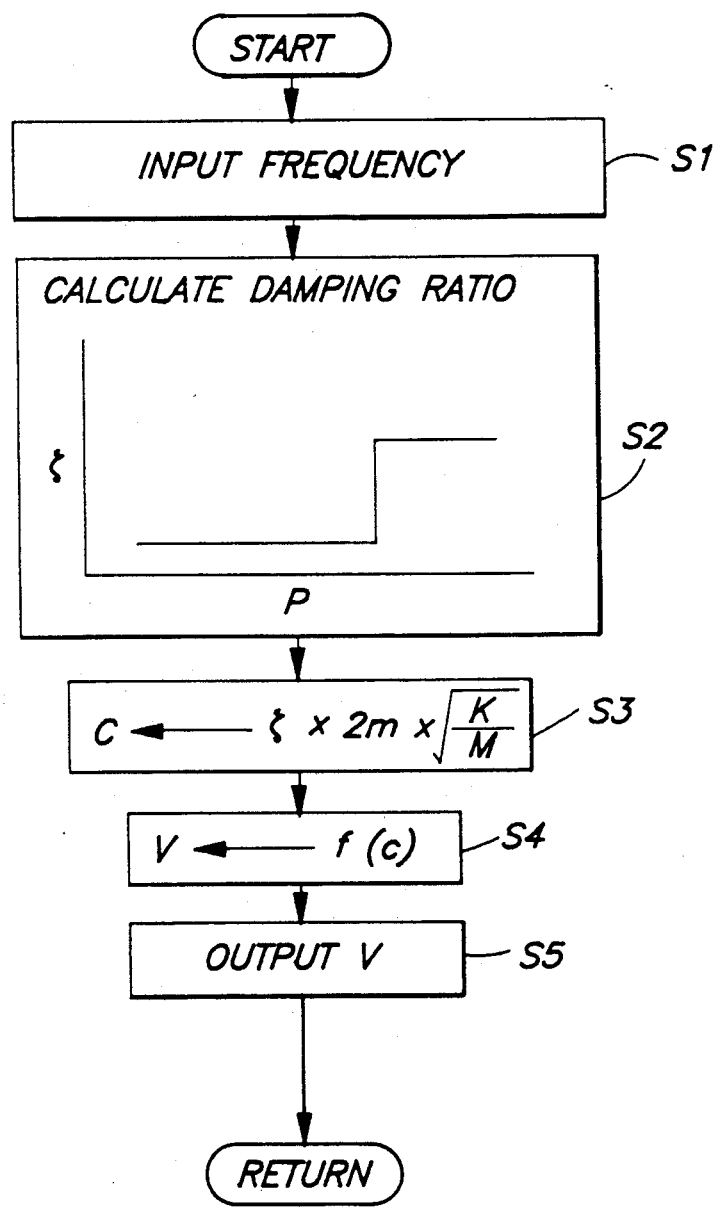
FIG. 6 is a flow chart for explaining the operation of the first embodiment.

FIG. 6 shows a general flowchart for a of control of the voltage V to be applied to the control circuit 20, wherein first, an oscillation frequency ω of the body 2 to be dampened, which is detected by the sensor 21, is input via the port 23 (step S1).

The control circuit 22 is provided with a data map or function, as shown in FIG. 5, which shows a desired characteristic of the damping ratio ζ with respect to a non-dimensional frequency P, and a value of the damping ratio ζ corresponding to the detected frequency ω is calculated from the map or function (step S2).

The damping factor C is calculated by $$C = \zeta \times 2m \times \sqrt{\frac{K}{M}} \quad (\text{step S3}).$$

A voltage level V to be applied is calculated based on the calculated damping factor C (step S4), and a signal is output to the control circuit 2 so that the calculated voltage V is applied to the electrodes 18 and 19, whereby the desired damping ratio ζ matching the sensed vibration frequency ω is obtained (step S5).

According to this embodiment, in accordance with the change of the frequency ω of the vibration applied to the body 2, the damping ratio ζ is controlled in accordance with the characteristic shown in FIG. 5, and therefore, the amplitude X1 of the body 2 is controlled along the line L1 in the area of the frequency ω lower than 0.8165, and along the line L2 in the area of the frequecy ω higher than 0.8165. This means that a low amplitude of the frequency of the body 2 is obtained over a wide range of the frequency of the vibration.

Figure 7:
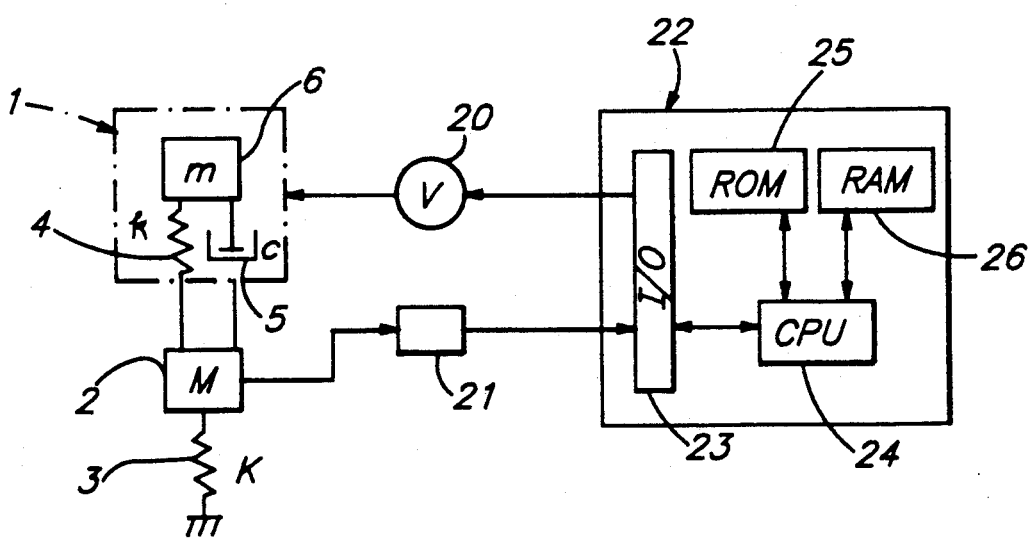
FIG. 7 is a general schematic view of the damping system according to the present invention having a spring parallel to the viscosity.
Figure 8:
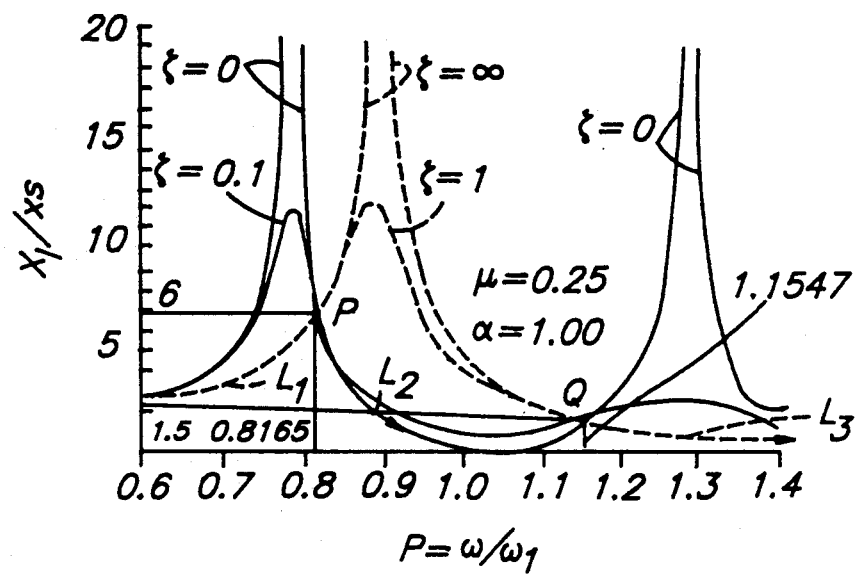
FIG. 8 is a graph showing relationships between a non-dimensional frequency and a non-dimensional amplitude with regard to various damping ratio values in the system shown in FIG. 7.

In another aspect, the damper 1 may be modified as shown in FIG. 7, wherein a spring 4 is arranged in parallel with respect to the damper unit 5. In this case, the damping ratio ζ is determined by $$\zeta = \frac{c}{2} \times \frac{1}{\sqrt{mk}}$$

where, m is the weight of auxiliary member 4, and k is a spring constant of the spring 4. In the prior art, the value of the damping ratio has only a single value, to obtain a desired damping characteristic, and cannot satisfactory dampen the vibration when the damper is used for a vibrating body other than that for which is designed. Furthermore, a desired damping characteristic cannot be obtained when the damping device is used for a vibration body wherein the condition of the vibration is changed in accordance with a lapse of the time. According to the present invention, the damping ratio ζ is controlled by varying the damping factor c of the damper 5 by controlling the viscosity of the Winslow fluid in the damper 5 as in the first embodiment. In this type of damping system where a spring 4 is arranged in parallel to the damper 5, two peaks of the amplitude are obtained, as shown in FIG. 8, when no damping (ζ=0) is applied to the vibration system.

Figure 9:
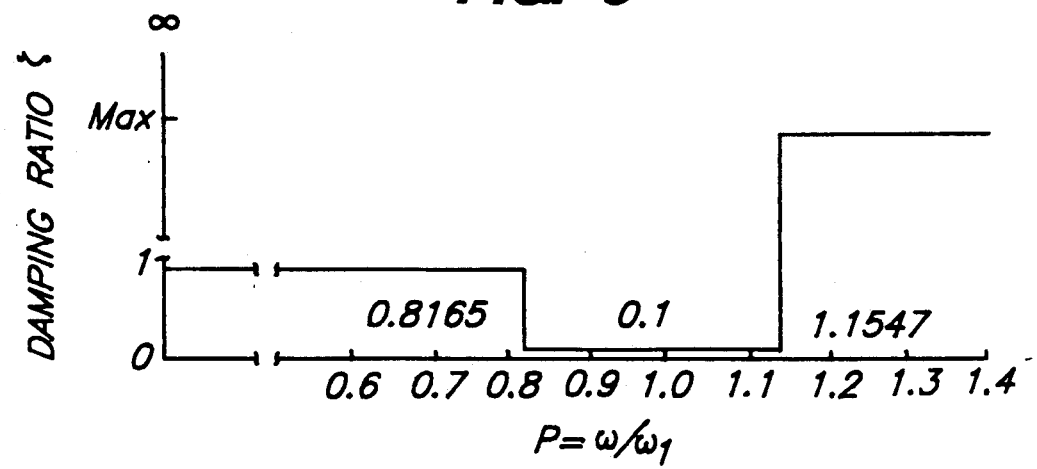
FIG. 9 is an example of setting a damping ratio within the frequency of the vibration.

The setting of the desired setting of the damping ratio ζ with respect to the change in the frequency of the vibrating body 2 can be different from that used in FIG. 4, and can be suitably adjusted in accordance with the requirement of the damping characteristic. In FIG. 8, for example, the desired damping ratio ζ has a value of 1.0 in a range of the non-dimensional frequency P of between 0 to 0.8165, a value of 0.1 in a range of the non-dimensional frequency P between 0.8165 and 1.1547, and a value of in a range of the non-frequency P of between 1.1547 and 1.4. The control circuit operates in substantially the same way as explained with reference to the flowchart in FIG. 6, to obtain the damping ratio as shown in FIG. 3 in accordance with the frequency of the vibration ω applied to the vibrating body 2 connected to the damper 1 according to the present invention. As a result, a damping characteristic in FIG. 9 is obtained such that the non-dimensional amplitude is controlled along the line L1 in the area of the non-dimensioned frequency P between 0.6 to 0.8165, along the line L2 in the area of the non-dimensional frequency P of between 0.8165 to 1.1547, and along the line L3 in the area of the non-dimensional frequency P of between 1.1547 to 1.4.

As another modification of the first embodiment, the electro rheological exciters, each of which comprises the electrodes 18 and 19, is arranged as an opposed and spaced pair in the passageways 14, along the entire length of the respective passageways 14. Alternatively, the electrodes 18 and 19 may be arranged in one of the passageways 14. Furthermore, instead of arranging the electrodes 18 and 19 along the entire length of the respective passageways 14, the electrodes 18 and 19 can be arranged at only the inlet end or outlet end of the respective passageway 14. Furthermore, the electrodes 18 and 19 in each of the pair do not necessarily coincide with respect to their axial positions. For example, one of the electrodes 18 and 19 in one pair can be arranged on one end of the respective passageway 14, and the other electrode 18 and 19 in the pair can be arranged on the other end of the respective passageway 14. It should be noted that a desired arrangement can be selected so as to obtain a desired Winslow effect, and thus obtain a required throttling or viscous characteristic of the fluid when the fluid is passed through the passageways 14 having the electrodes 19 and 19, from which an electric field is created for controlling the viscosity of the fluid passed therethrough.

Figure 10:
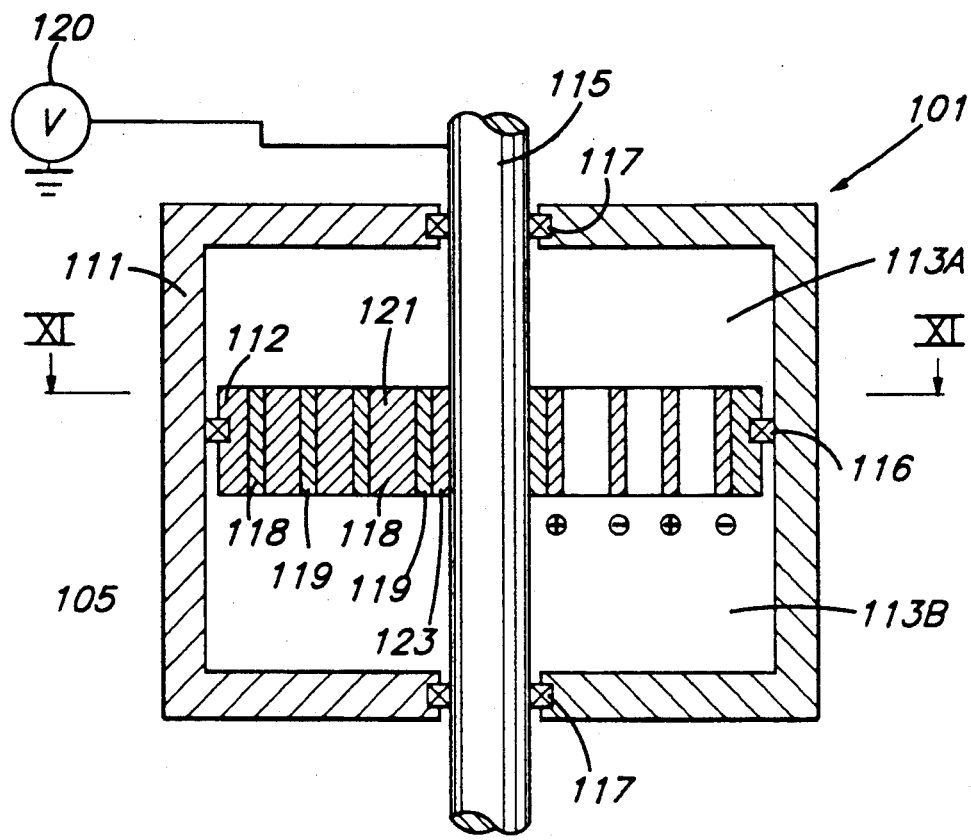
FIG. 10 is a longitudinal cross-sectional view of a piston damper in another embodiment.
Figure 11:
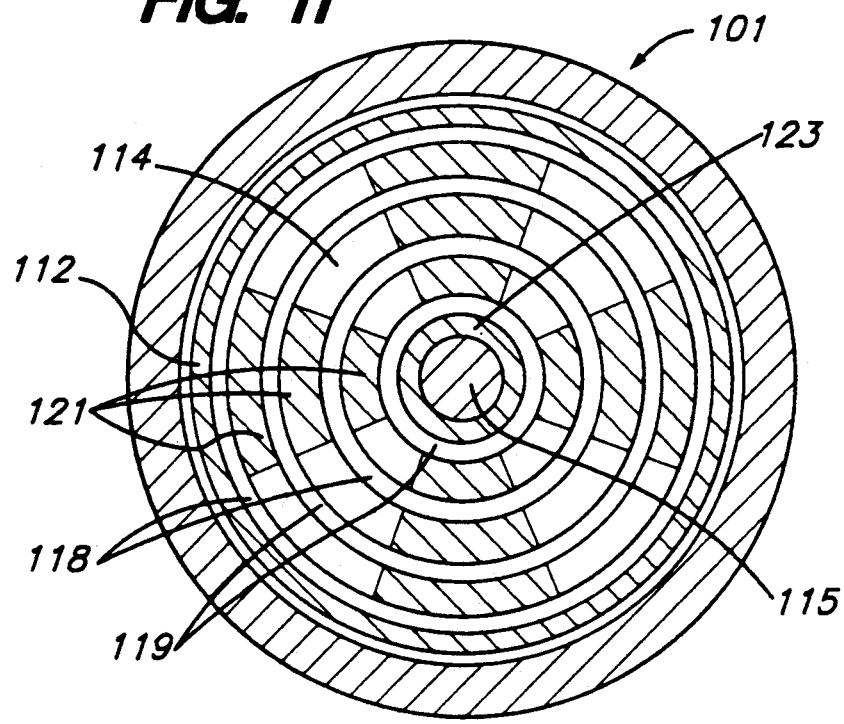
FIG. 11 is a cross sectional view taken along XI—XI line in FIG. 10.

FIGS. 10 and 11 show an embodiment wherein an arrangement of the electrode device is modified. In this embodiment, a damper 105 basically comprises a case 111, a piston 112, and a shaft 115. Chambers 113A and 113B are formed in the case 111 on the sides of the piston 112, respectively, in which electro rheological fluid for obtaining the Winslow effect is stored. The shaft 115 is made slidable with respect to the case 111, by providing annular seal members 117. The piston 112 is ring shaped, and has a piston ring 116 thereon. The damper 105 is further provided with a electrode device which is integral with the ring-shaped piston 112. The electrode device comprises a plurality of concentric electrode rings 118 and 119 which are alternately arranged and a plurality of electric insulator sectors 121. The outermost electrode ring 118 is fixedly connected to the inner surface of the outer ring 121, and the innermost electrode ring 119 is fixedly connected to the shaft 115 via a inner electrically insulating ring 123. As shown in FIG. 11, the insulator members 121 each form a sector shape and are arranged between adjacent electrode rings 118 and 119, to be circumferentially spaced from each other, and as a result, a plurality of axially extending and circumferentially spaced passageways 114 are formed between the electrode rings 118 and 119 and the insulator sectors 121. Furthermore, the sectors 121 are arranged along radial lines which are angularly spaced at an angle of 90 degrees, so that the passageways 114 are arranged along radial lines which are also angularly spaced at an angle of 90 degrees. Furthermore, the electrode rings 119 are connected to the electric source 120 so that each adjacent pair of the electrode rings 119 has an opposite polarity.

As in the first embodiment, when an electric voltage is applied across the adjacent ring electrodes 119, an electric field is created therebetween in the direction transverse to the direction of the flow of fluid from the chambers 113A to 113B, or vise versa, which causes the viscosity of the fluid to be increased. As a result, the flow resistance of the fluid when passing through the passageways 114 is controlled, to thereby control the damping characteristic of the damper 101. As in the first embodiment, the voltage applied across the adjacent pair of the ring shaped electrodes 119 is controlled in accordance with such factors as the position of the piston 112 with respect to the casing 111, and the direction of the movement of the piston 112, to obtain a desired characteristic of the damper 101, and thus obtain a desired damping characteristic of the oscillating system. As a result, an effective damping can be obtained not only in where the vibration level is normal but also where the vibration has a smaller pitch than usual or the vibration is slow and has a large amplitude. Furthermore, the vibration can be effectively suppressed even if the condition of the vibration is changed in accordance with a lapse of time.

The effect of the increase in viscosity caused by the electric fields is weakened in accordance with the increase in the shear velocity of the fluid. Therefore, in the damper 101 shown in FIGS. 10, and 11, a plurality of radially aligned and circumferentially extending passageways 114 are formed, so that a low speed of the fluid (shear speed) passing through the passageways 14 can be obtained, even when the speed of the piston 112 is high. Therefore, the viscosity increasing characteristic by the electric field passing through the passageways 14 is maintained without weakening in a vibrating system where the speed of the piston 112 can be abruptly changed, so that an effective damping of the vibration in the piston 112 can be obtained. A combination of only the rings 119 and the insulating blocks 121 allows a plurality of the passageways 114 to be obtained, which simplify the construction of the piston assembly of the damper 101.

In the embodiment of FIGS. 10 and 11, each of the electrodes 119 is provided extended along the entire length of the passageway 114 from one end to the other end, but the electrodes 119 can be arranged at only the inlet end or outlet end of the respective passageway 114. Furthermore, the electrodes 119 in each adjacent pair do not necessarily coincide with respect to their axial positions. For example, one of the electrodes 119 in one pair can be arranged on one end of the respective passageway 114, and the other electrode 119 in the pair can be arranged on the other end of the respective passageway 114. It should be noted that a desired arrangement can be selected so as to obtain a desired Winslow effect by which a required throttling or viscous characteristic of the fluid is obtained when the fluid is passed through the passageways 114 having the electrodes 119 by which an electric field is created for controlling the viscosity of the fluid passing therethrough.

Figure 12:
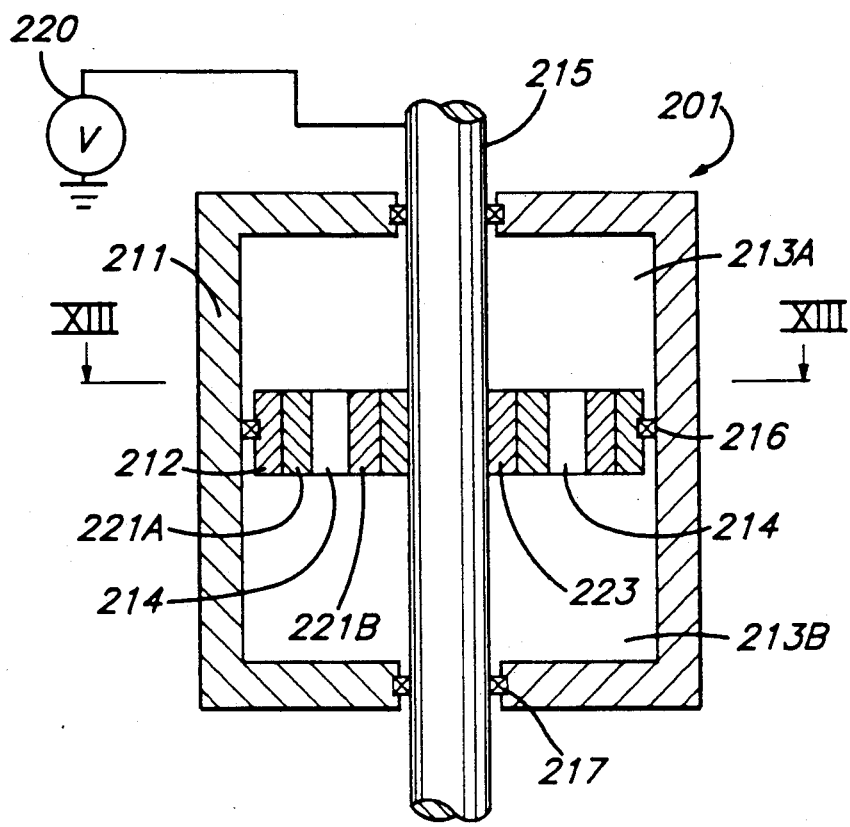
FIG. 12 is a longitudinal cross-sectional view of a piston damper in yet another embodiment.
Figure 13:
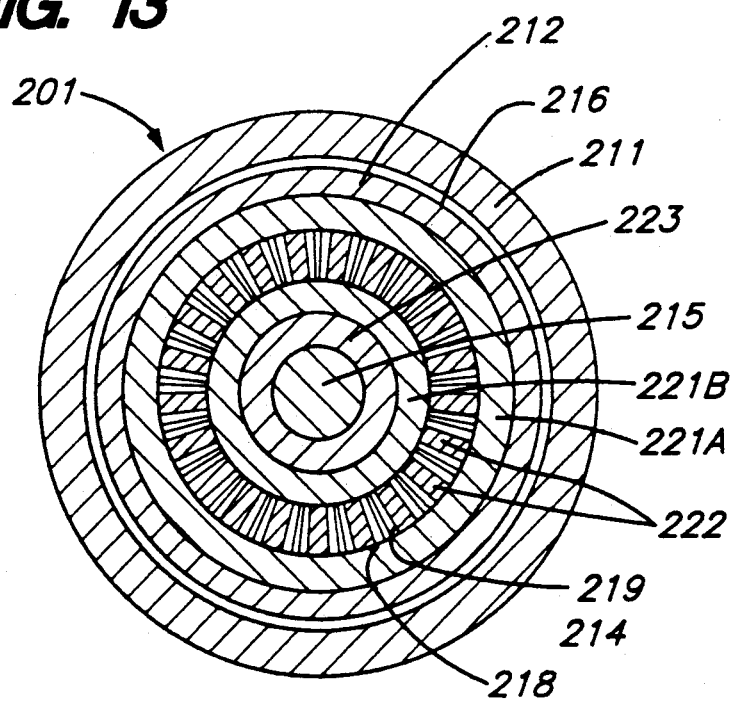
FIG. 13 is a cross sectional view taken along XIII—XIII line in FIG. 12.
Figure 13:
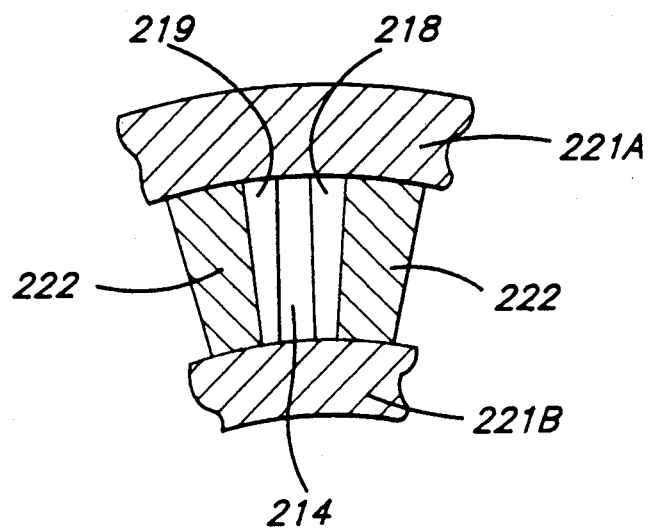

In another embodiment shown in FIGS. 12 and 13, a piston assembly comprises an annular piston 212, outer and inner annular rings 221a and 221b made of an electric insulating material, an inner annular support 212c, and plurality of spacers 222 made of an electric insulating material, as shown in FIG. 13. These spacers 222 are arranged between the outer and inner insulating rings 212a and 212b, so that the spacers 222 are equiangularly spaced along the circumference of the piston, to form equiangulary spaced gaps between the adjacent spacers 222. A pair of electrodes 219a and 219b are formed on the facing side of the adjacent spacers 222 limiting the gap, so that a passageway 214 is formed between each of the faced electrodes 219a and 219b. As is easily understood, a plurality of the passageways 214 are arranged along the circumference of the piston 212, to connect the upper chamber 213A and the lower chamber 213B. A description of the remaining construction of this embodiment is omitted since it is substantially the same as that of the former embodiments. It should be noted that reference numerals wherein 200 is added to the numeral of the corresponding parts in the first embodiment are used. Furthermore, in the same way, the electric supply 220 is connected to the each pair of the electrodes 218 and 219, so that the viscosity of the Winslow fluid passing through the passageway 214 between the chambers 213A and 213B is controlled. As a result, the throttling resistance of the fluid passing through the orifices 214 is controlled to control the damping ratio in accordance with the oscillating frequency.

In the embodiment shown in FIGS. 12 and 13, a plurality of the passageways 214 can be provided along the circumference of the piston 212, so that a low speed of the fluid (shearing speed) is obtained when it passes through the orifice 214 even if the speed of the piston 212 is high. Therefore, a viscosity increasing effect by the electric field upon the passage of the orifices 214 is not weakened where the vibration system is such that the speed of the piston is rapidly changed, thereby effectively dampen the vibration transmitted to the piston 212.

Figure 14:
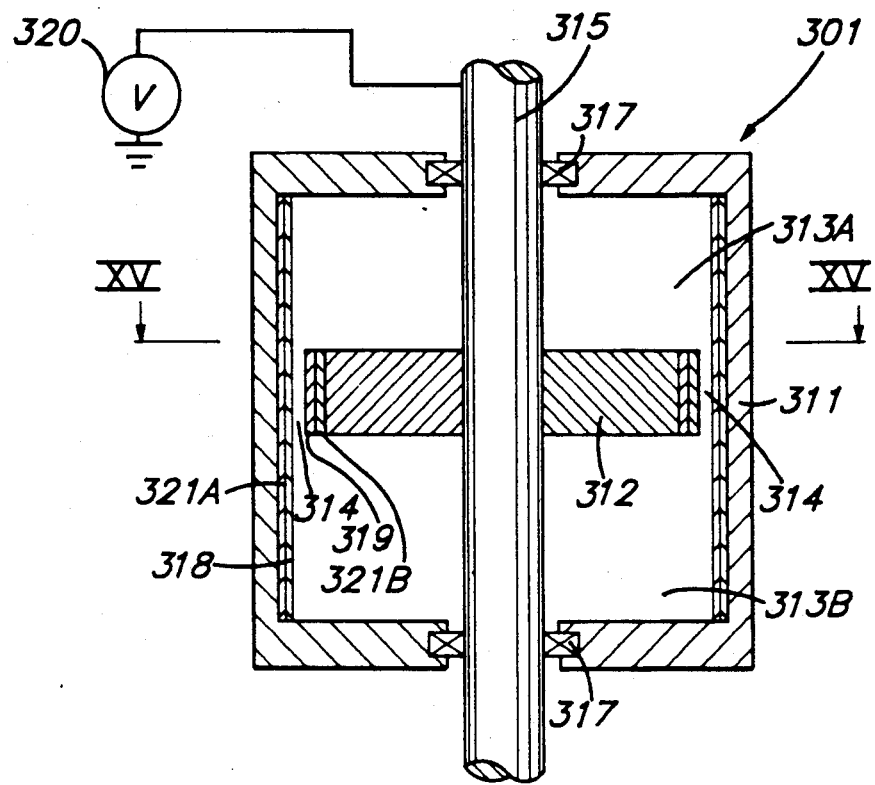
FIG. 14 is a longitudinal cross-sectional view of a piston damper in still another embodiment.
Figure 15:
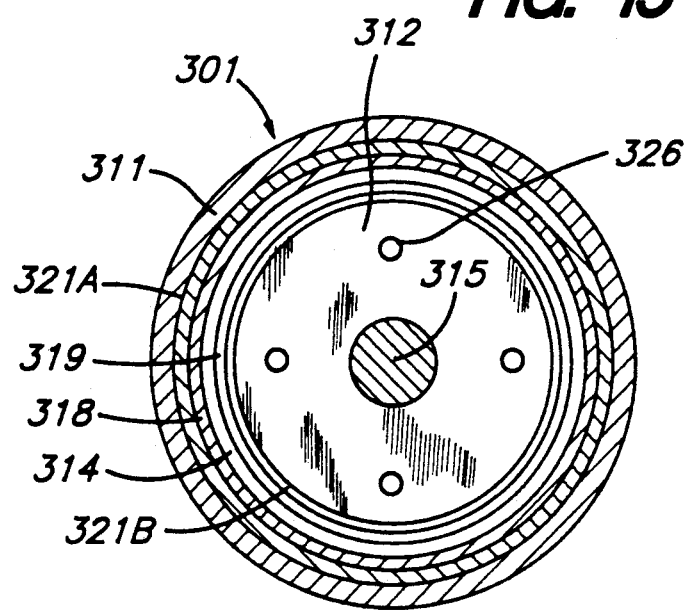
FIG. 15 is a cross sectional view taken along XV—XV line in FIG. 14.

In another embodiment shown in FIGS. 14 and 15, a damper 301 has an electrode device which is arranged between the outer periphery of the piston 312 and inner surface of the case 311, between which a throttle passageway 314 is also formed. As shown in FIG. 15, the case 311 defines an inner tubular surface on which an annular electrode layer 318 is formed by way of an annular electric insulating layer 321a. The piston 312 defines at its outer periphery an annular electrode 319 via an annular electric insulating layer. An annular slit as an orifice passageway 314 is formed between the facing inner electrodes 318 on the casing 311 and an outer electrode 319 on the piston 312, which passageway 314 is located between the upper chamber 313A and lower chamber 313B. A Winslow fluid is stored in the upper and lower chambers 313A and 313B.

In the embodiment shown in FIGS. 14 and 15, a voltage applied across the facing electrodes 318 and 319 causes an electric field to be created therebetween which is transverse to the flow of fluid passing through the passageway 314 between the chambers 313A and 313B, causing the viscosity of the fluid passed though the orifice 314 to be increased, and as a result, the damping characteristic of the damper is controlled. In this embodiment, an annular orifice 314 for creating the damping resistance is formed between the outer surface of the piston 312 and the casing 311. In a conventional system, a seal such as 16 in FIG. 1, is provided between the piston and the casing to enable a sliding motion of the piston 312 with respect to the casing 311 while a fluid tight seal therebetween is created, and orifices such as 14 in FIG. 1 are formed in the cylinder. Contrary to this, an annular orifice is formed between the piston 312 and casing 311 and the seal members therebetween are omitted. Due to this omission of the seal, a frictional force does not occur between the piston 312 and the casing 311, which allows the piston 312 to be moved more smoothly and quickly. Furthermore, the annular passageway 314 between the piston 312 and 314, where the electric damping control devices 318 and 319 according to the present inventions are provided, can be effectively used as a control unit for controlling the damping characteristic by the damper 301.

It should be noted that, in the embodiment in FIGS. 14 and 15, auxiliary damping orifices 326 may be additionally provided in the piston 312 in the usual manner.

Figure 16:
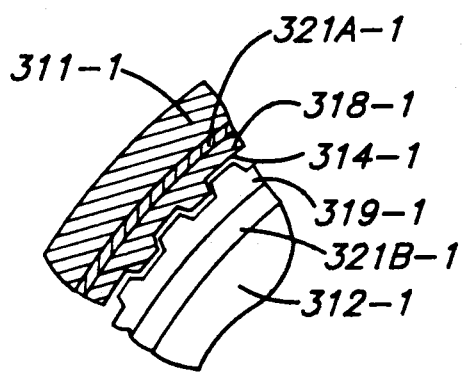
FIGS. 16 and 17, respectively, illustrate modifications of the arrangement of electrodes in the embodiment shown in FIGS. 14 and 15.

In a modification of the last embodiment, as shown in FIG. 16, the electrode layer 318-1 on the inner surface of the casing 311-1 is provided with circumferential spaced axially extending projections and recess, which are arranged alternately in the circumferential direction, and the electrode 319-1 on the outer surface of the piston 312-1 is provided with circumferentially spaced axially extending projections and recesses, which are arranged alternately in the circumferential direction. The electrode plates 318-1 and 319-1 are arranged so that the projected portions of one of the electrodes extend into opposite recesses of the facing electrodes.

Figure 17:
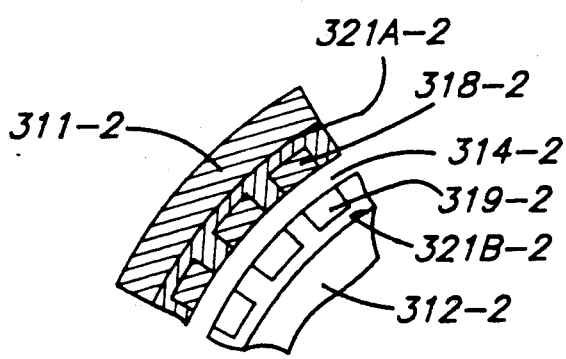

In another modification, as shown in FIG. 17, the electrodes 318-2 on the inner surface of the case 311-2 are formed by electro-conductive strips 318-2 each extending axially while spaced circumferentially on the casing 311-1, and embedded in the electro insulating material layer 321a-2. The electrodes 319-2 on the outer surface of the piston 312-2 are formed by electro conductive strips 319-2 each extending axially while spaced circumferentially on the outer periphery of the piston 312-1, and embedded in the electroinsulating material layer 321b-2. Furthermore, the electrode strips 318-2 on the casing 311-2 are arranged so as to face the corresponding electroconductive strips 319-2 on the piston 312-2.

Figure 18:
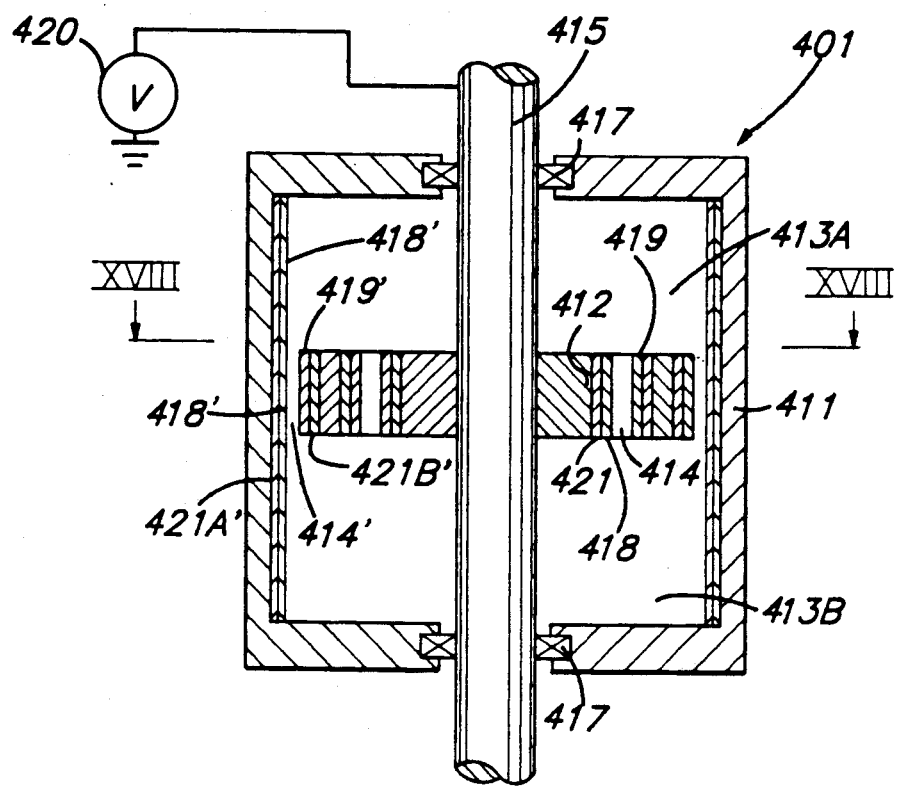
FIG. 18 is a longitudinal cross-sectional view of a piston damper in another embodiment.
Figure 19:
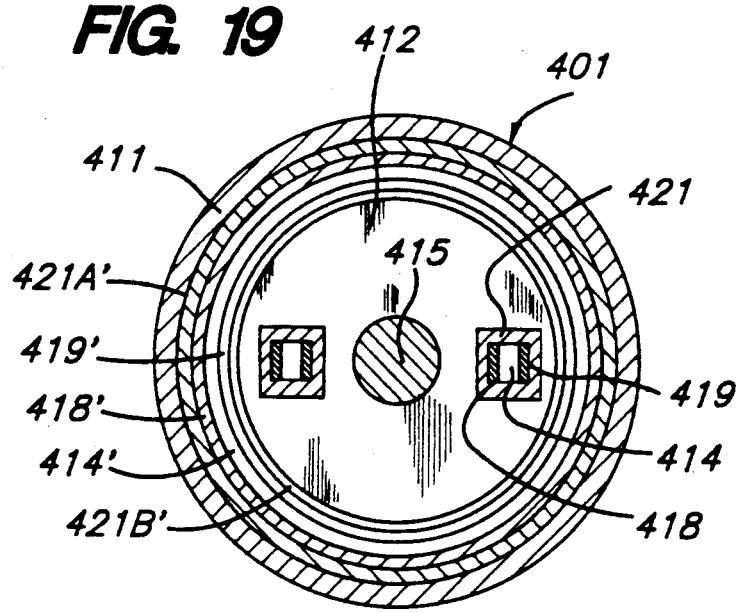
FIG. 19 is a cross sectional view taken along XVIII—XVIII line in FIG. 18.

An embodiment shown in FIG. 18 and 19 is a combination of the embodiment shown in FIGS. 2 and 3 where the electrodes for creating an electric field are arranged in the orifice in the piston, and the embodiment shown in FIGS. 14 and 15 where the electrode is arranged between the piston and the casing. In FIG. 14 and 15, a damper 401 is provided with a piston 412 having openings, in each of which a rectangular shape insulator sleeve is fitted, and electrodes 418 and 419 are arranged in each of the openings so as to face each other and between which orifices 414 are formed. Furthermore, an annular electrode 418' is formed on the inner surface of the casing 411 via an electric insulator layer 421a', and an annular electrode 419' is formed on the outer surface of the piston 412 via an electric insulator layer 421b', so that an annular orifice 414' is formed between the electrodes 418' on the casing 411 and the electrode 419' on the piston 412. As in the embodiment described above, an electric voltage source 420 is connected to the electrodes 418 and 419, and electrodes 418' and 419', so that the viscosity of the fluid passing through the orifices 414 and the viscosity of the fluid passing through the annular orifice 414' are suitably and independently controlled, whereby the damping characteristic of the damper 401 can be effectively controlled.

Figure 20:
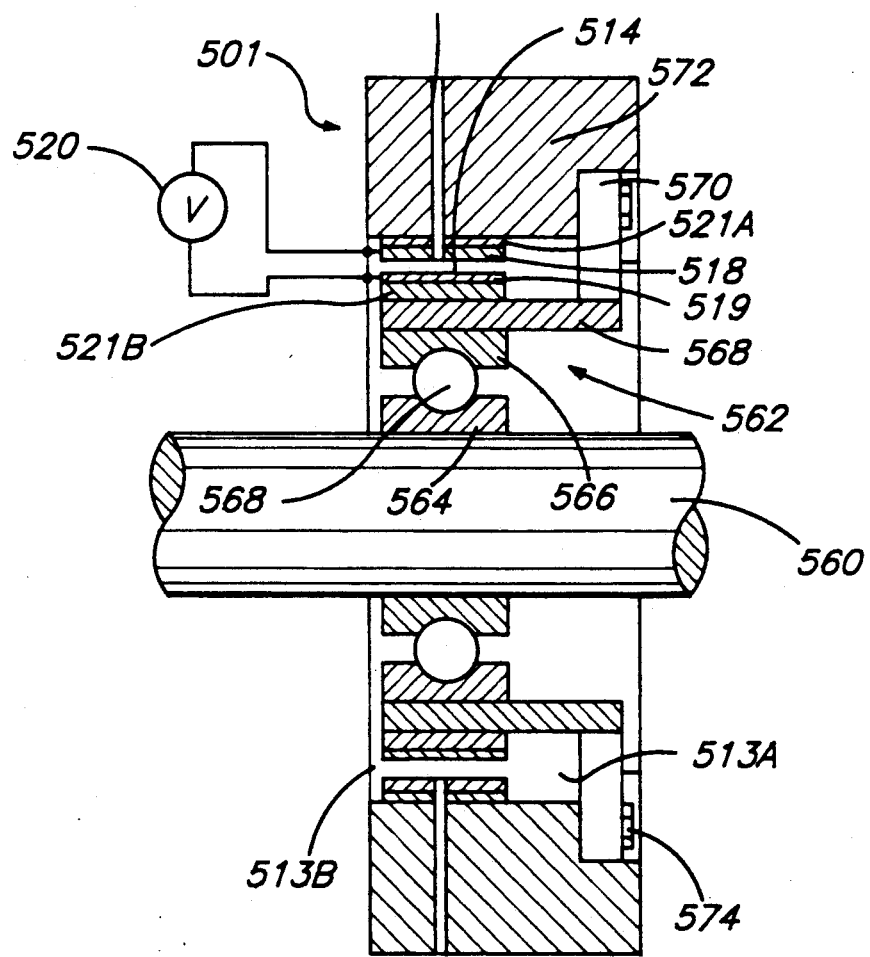
FIG. 20 is a longitudinal cross-sectional view of another embodiment of the present invention directed to a damper bearing system.
Figure 21:
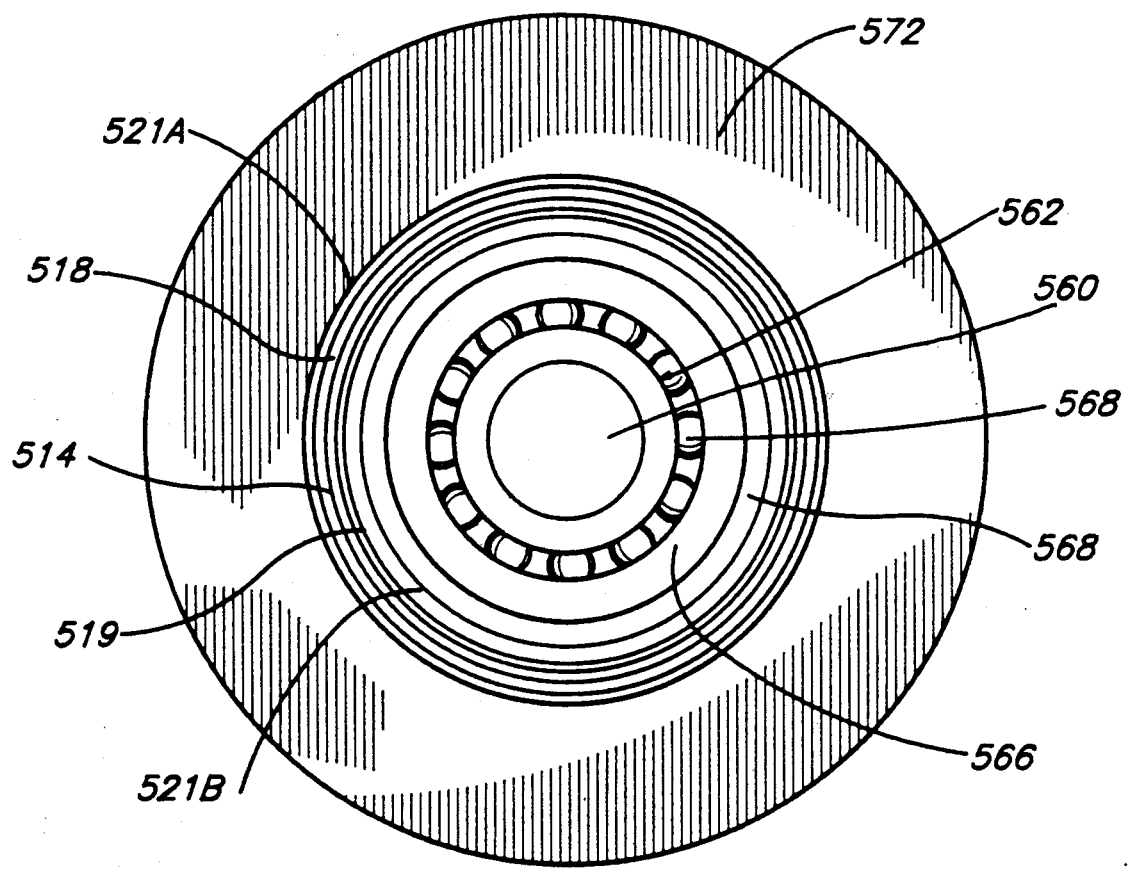
FIG. 21 is a front view of the damper bearing system shown in FIG. 20.

FIGS. 20 and 21 are directed to an embodiment wherein the damping system according to the present invention is utilized in a damper bearing system for supporting a rotating shaft. In FIG. 20, a damper device 501 is used for damping a rotating shaft supported by a bearing assembly 562, which is provided with an inner race 56, an outer race 466, and a plurality of balls 568 arranged between the inner racing 564 and the outer racing 566. The inner race 564 is fitted to the shaft 560, and the outer racing 566 is fitted to an end of a sleeve 568 having an elasticity. The other end of the sleeve 568 is connected to a support ring 570 connected to a supporting body 572 by bolts 574. The damper device 501 is constructed by a fluid damper having an annular orifice passageway 514 formed between an annular electrode 518 formed on an inner surface of the body 572 via an annular electric insulating layer 521a, and an inner annular electric layer 519 formed on the outer surface of the support 568 via an annular electric insulating layer 521b. The electrodes 518 and 519 are connected to a voltage source 520. These annular shape electrodes 518 and 519 extend along the entire length of the orifice 514, and spaces 513A and 513B are formed on the sides of the orifice 514, in which electro rheological fluid is charged, so that the fluid passes between the chambers 513A and 513B via the passageway 514. The body 572 forms a passageway 582 having a first end open to the annular orifice passageway 514 and a second end connected to a source of electro rheological fluid.

The operation of the embodiment in FIGS. 18 and 19 will be explained. The electro rheological fluid from the supply passageway 14 is introduced into the damper orifice 514 so that the fluid, when passing through the annular damping orifice 514, forms a film, is subjected to a squeeze effect whereby the vibration of the shaft 560 transmitted to the body 572 is damped, and the fluid is then discharged to the annular chambers 513A and 513B located on both sides of the passageway 514. As in the embodiment explained above, the damping factor C is determined by a viscosity factor of the electro rheological fluid, the length of the orifice 514, and the thickness of the orifice 514.

When a voltage applied across the electrodes 518 and 519 causes an electric field to be created therebetween in a direction transverse to the electro rheological fluid in the passageway 514 directed to the ends thereof, the viscosity of the fluid in the passageway 514 is increased. This change in the viscosity of the fluid allows the damping factor C of the damper section 501 to be easily controlled, so that an optimum vibration damping effect can be applied to the rotating shaft 560, to thereby obtain a stable operating condition of the rotating system. Furthermore, when the rotation vibration system to which the damper device 501 is applied is such that the condition of the vibration is changed in accordance with a lapse of time, an effective damping of the vibration can be obtained regardless of a change in vibration state, by a control of the viscosity obtained by controlling the voltage applied across the electrodes 518 and 519.

It should be noted that a bearing device having a damper is disclosed in Japanese Unexamined Patent Publication 54-96650 or 57-1822, but this prior art disclose only a fluid damper made as a thin film of fluid between the bearing housing and the bearing, which film is formed by a fluid supplied to a space formed between the bearing housing and the bearing. The vibration of the bearing is dampened by a squeeze effect of the oil film in the damper portion. Further, contrary to the present invention, the prior art bearing can only be provided with only value of the damping factor C, which is determined by a viscosity factor m of the fluid, the length L of the fluid film, and a thickness g of the oil film. Therefore, it is impossible to vary the damper ratio after the bearing is assembled, and therefore, an inevitable error or tolerance of the bearing with respect to the designated design may prevent the damper from obtaining a desired damping effect. Furthermore, the damper is only applicable to a rotating device of a rotary vibration system having a designated characteristic, and can not be applied to a rotating device having different vibration characteristics. The embodiment of FIGS. 20 and 21 overcomes the drawbacks of the prior art bearing.

Figure 22:
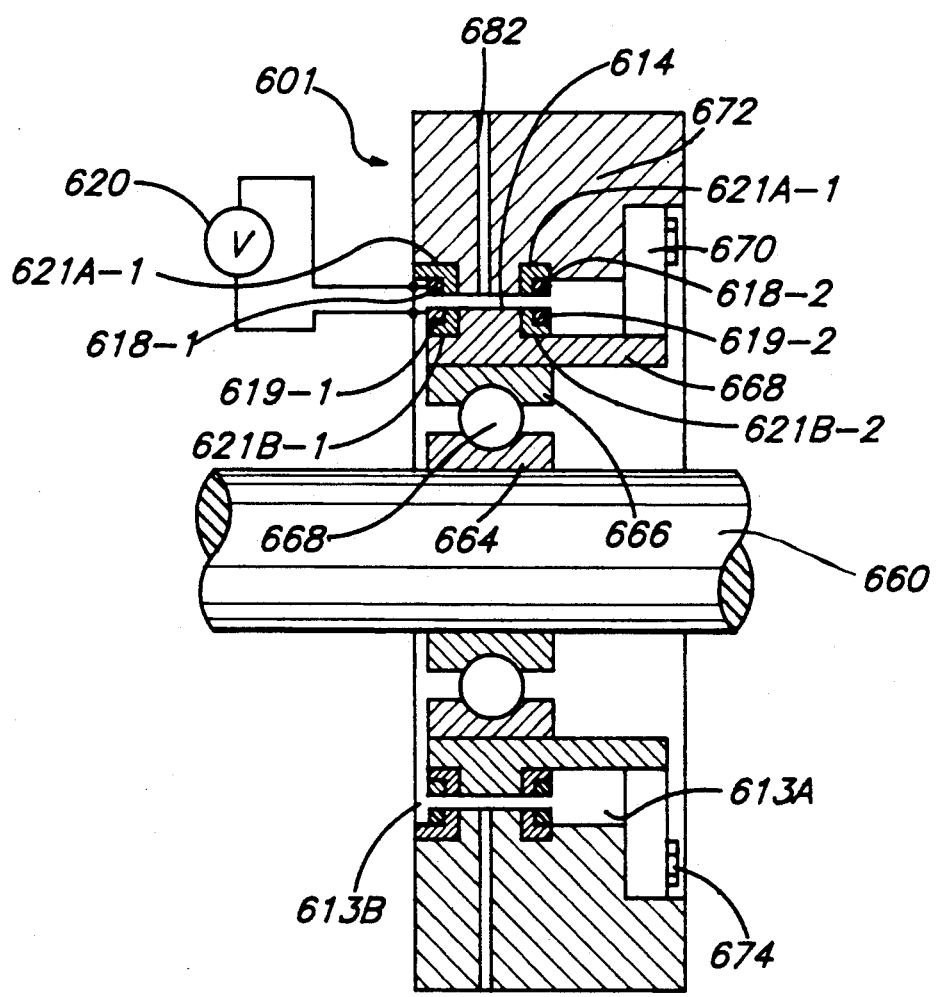
FIG. 22 is a longitudinal cross-sectional view of another embodiment of the present invention directed to a damper bearing system.
Figure 23:
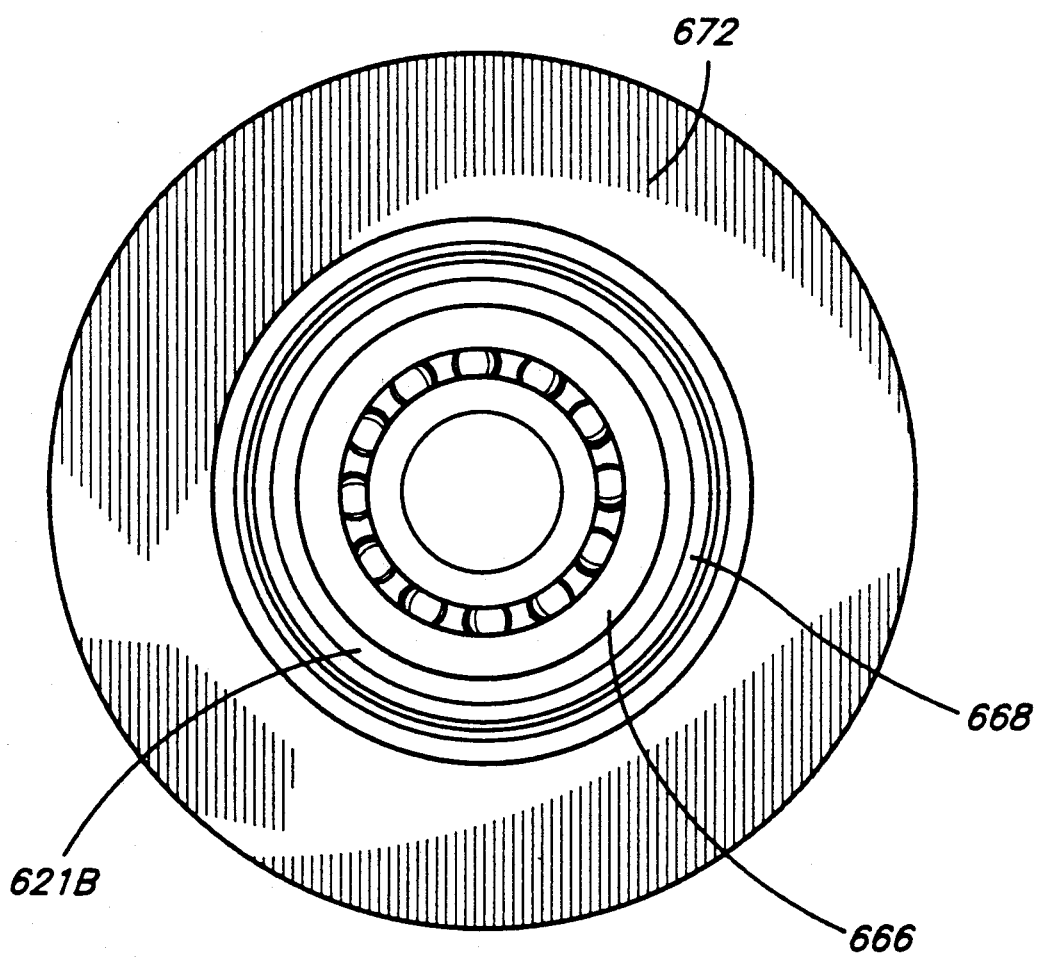
FIG. 23 is a front view of the damper bearing system in FIG. 22.

FIGS. 22 and 23 show a modification of the bearing with damper. In this embodiment, two pair of ring shaped electrodes (618-1, 619-1) and (618-2, 619-2) are arranged at ends of the annular orifice 614. The electrodes 618-1 and 618-2, which are located to be axially spaced, are arranged circumferentially on a support body 668 having an elasticity by way of annular electric insulating members 621b-1 and 621b-2, respectively. The electrodes 619-1 and 619-2, which are axially spaced, are arranged circumferentially on a body 672 by way of annular electric insulating members 621a-1 and 621a-2, respectively. The electrodes 618-1 and 619-1 are arranged to face each other and constructs a first set of electrodes on one end of the slit for a fluid film. The electrodes 618-2 and 619-2 are arranged to face each other and construct a second set of electrodes on the other end of the slit for a fluid film. It should be noted that an electric supply circuit 620 is independently connected to the two sets of the electrodes 618-1 and 619-1, and 618-2 and 619-2.

The remaining construction of the bearing is substantially the same as that in FIGS. 20 and 21, and therefore, a detailed explanation thereof is omitted. Note the number 100 is added to the number of corresponding parts in FIGS. 20 and 21.

In the embodiment shown in FIGS. 22 and 23, an electric voltage is applied to the electrode pairs (618-1 and 619-1; 618-2 and 619-2) locally arranged on axial ends of the annular slits, in such manner that the fluid located between the electrode pairs are controlled.

Although the present invention is described with reference to the above embodiments, many modifications and changes can be made by those skilled in this art without departing from the scope and spirit of the present invention.

I claim:

1. A damper system for damping a vibrating body, comprising:
    a tubular housing;
    a piston axially slidably arranged in the housing;
    a piston rod extending outside of the housing connecting the piston to the vibrating body;
    a first chamber formed in the housing on one side of the piston;
    a second chamber formed in the housing on the other side of the piston;
    each of said chambers containing a electrorheological fluid whose viscosity can be increased by applying an electric field thereto;
    first annular sealing means located in the outer periphery of the piston between it and the housing, to obtain a sealed contract therebetween;
    second annular sealing means located in the outer periphery of the piston rod between it and the housing to obtain a sealed contract therebetween;
    said piston having at least one axially extending rectangular opening therein communicating said first and second chambers with each other for creating resistance to movement of the piston in the housing caused by vibration of the vibrating body, which resistance is generated by throttling the fluid passing through the opening, said opening having at least one pair of flat walls on opposite sides of the rectangular opening facing each other;
    a pair of flat electrodes located on said opposite facing flat walls of said opening for creating an electric field therein that is directed transverse to the flow of the fluid through the opening to thereby alter the viscosity of the fluid in the opening; and
    control means for controlling the strength of said electric field so that a desired damping characteristic is obtained within a designated range of frequency of vibration of the vibrating body.

2. The damper of claim 1, wherein two diametrically opposite rectangular openings are provided in the piston, and a pair of electrodes are provided in each of the openings.

3. The damper of claim 2, wherein each of said electrodes extend along the entire axial length of the opening.

4. The damper of claim 1, wherein said control means comprise means for detecting the frequency of the vibrating body, means for calculating a setting of the damping characteristic in accordance with the detected frequency, and means for controlling the voltage applied to said electrode means to obtain a desired damping characteristic.

5. The damper of claim 4, wherein said calculating means comprises a memory of data indicating a damping characteristic at various values of frequency, and means for calculating, based on the data, a value of a damping characteristic matching the detected frequency.

* * * * *